United States Patent
Clissold et al.

(10) Patent No.: US 10,489,166 B2
(45) Date of Patent: *Nov. 26, 2019

(54) DYNAMICALLY RECONFIGURING TIME ZONES IN REAL-TIME USING PLURAL TIME ZONE LIBRARIES

(71) Applicant: International Business Machines Corporation, Armonk, NY (US)

(72) Inventors: David N. Clissold, Austin, TX (US); Su Liu, Austin, TX (US); Michael Ow, San Francisco, CA (US); Teerasit Tinnakul, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 135 days.

This patent is subject to a terminal disclaimer.

(21) Appl. No.: 15/632,493

(22) Filed: Jun. 26, 2017

(65) Prior Publication Data

US 2017/0293497 A1 Oct. 12, 2017

Related U.S. Application Data

(63) Continuation of application No. 15/628,687, filed on Jun. 21, 2017, which is a continuation of application No. 14/519,187, filed on Oct. 21, 2014, now Pat. No. 9,727,028, which is a continuation of application No.

(Continued)

(51) Int. Cl.
| | |
|---|---|
| *G06F 1/24* | (2006.01) |
| *G06F 9/00* | (2006.01) |
| *G06F 9/445* | (2018.01) |
| *G04G 5/00* | (2013.01) |
| *G06F 16/2458* | (2019.01) |
| *G06F 8/65* | (2018.01) |

(52) U.S. Cl.
CPC ........... *G06F 9/44505* (2013.01); *G04G 5/00* (2013.01); *G06F 8/65* (2013.01); *G06F 16/2477* (2019.01)

(58) Field of Classification Search
None
See application file for complete search history.

(56) References Cited

U.S. PATENT DOCUMENTS

| | | |
|---|---|---|
| 7,916,580 B2 | 3/2011 | Nalla et al. |
| 7,948,832 B1 | 5/2011 | Luo et al. |
| 8,331,200 B1 | 12/2012 | Luo et al. |

(Continued)

OTHER PUBLICATIONS

Stack Overflow, "Is there a library available to workaround out of date timezone data?", http://http://stackoverflow.com/questions/8759833/is-there-a-library-available-to-workaround-out-of-date-timezone-data, Accessed on Jul. 28, 2014.

Chalabi et al., "Rmetrics—timedate Package", Contributed Research Articles, The R Journal, vol. 3 No. 1, Jun. 2011, pp. 19-24.

Islwyn et al., "Changing the Time Zone on an Android", Changing the Time Zone on an Android | Chron.com, http://smallbusiness.chron.com/changing-time-zone-android-32907.html, pp. 1-3, Accessed on Jul. 28, 2014.

(Continued)

*Primary Examiner* — Nitin C Patel

(74) *Attorney, Agent, or Firm* — Teddi E. Maranzano

(57) ABSTRACT

A computer program product for dynamically reconfiguring time zones in real-time using plural time zone (TZ) libraries is provided. The method provides integrating a first time zone information data (TZID) version and a second TZID version into a TZ library in an operating system. A first configuration comprising the TZ library and the first TZID version is selected. Responsive to adjusting the first configuration to a second configuration comprising the TZ library and the second TZID version, the second configuration is used automatically without restarting the operating system and without restarting an application.

6 Claims, 5 Drawing Sheets

Related U.S. Application Data

14/462,601, filed on Aug. 19, 2014, now Pat. No. 9,740,176.

(56) References Cited

U.S. PATENT DOCUMENTS

| | | |
|---|---|---|
| 8,335,132 B2 | 12/2012 | Arena |
| 8,370,364 B2 | 2/2013 | Rhoten |
| 2002/0145944 A1 | 10/2002 | Wright |
| 2007/0157168 A1 | 7/2007 | Traxel et al. |
| 2007/0201311 A1 | 8/2007 | Olson |
| 2008/0178150 A1 | 7/2008 | King et al. |
| 2011/0216628 A1 | 9/2011 | Nalla et al. |
| 2014/0149560 A1 | 5/2014 | Hakami et al. |
| 2015/0006877 A1 | 1/2015 | Chiba |
| 2015/0323905 A1 | 11/2015 | May et al. |
| 2016/0054708 A1 | 2/2016 | Clissold et al. |
| 2016/0054709 A1 | 2/2016 | Clissold et al. |

OTHER PUBLICATIONS

"Joda-Time Introduction", Joda-Time—Java date and time API—User Guide, http://www.joda.org/joda-time/userguide.html, Accessed on Jul. 28, 2014, pp. 1-10.

"Joda-Time—Java date and time API", Joda-Time—Java date and time API—Home, http://www.joda.org/joda-time/index.html, pp. 1-2, Accessed on Jul. 28, 2014.

The R Journal, A peer-reviewed, open-access publication of the R Foundation for Statistical Computing, vol. 3, No. 1, Jun. 2011, pp. 1-102.

Pending U.S. Appl. No. 15/628,687, filed Jun. 21, 2017, entitled "Dynamically Reconfiguring Time Zones in Real-Time Using Plural Time Zone Libraries", 25 pages.

IBM: List of IBM Patents or Patent Applications Treated as Related (Appendix P), Jul. 17, 2017, 2 pages.

DYNAMICALLY RECONFIGURING TIME ZONES IN REAL-TIME USING PLURAL TIME ZONE LIBRARIES

FIELD OF THE INVENTION

This disclosure relates generally to management of predefined time zone definitions, and more particularly to dynamically reconfiguring time zones in real-time using plural time zone libraries.

BACKGROUND

Modern operating systems may support multiple independent time zone (TZ) libraries, such as Olson and POSIX, which are collections of TZ information data by time zone. The TZ libraries and associated TZ information data may be provided as a series of data files. Each TZ library may be searched to obtain the desired TZ information data for a given time zone, for example an offset from Universal Standard Time (UTC), and any applicable Daylight Savings Time (DST) rules.

A computer system may provide a default system-wide TZ library/TZ information data pair setting. Additionally, each user, or application, may have a customizable profile where a preferred TZ library/TZ information data pair is set that overrides the system default. Therefore, within the same computer system several different TZ library/TZ information data pair settings may exist. A system-provided application programming interface (API), for example the localtime( ) function, checks system TZ setting, accepts as input a TZ library/TZ information data pair and returns the time for the requested time zone, formatted according to language and locale settings associated with the requested time zone. However, the TZ library/TZ information data pair is fixed for the duration of the application or user session, and may not be changed dynamically.

Regions around the world can change their TZ information data, for example DST rules, at any time, thereby requiring an update to TZ libraries and TZ information data many times throughout the year to stay current with all the latest TZ information data changes worldwide. However, because updates to TZ information data may be supplied as part of a vendor's operating system maintenance, where the customer's operating system may be not regularly maintained and updated, the TZ information may not be consistent across versions of TZ information data and between TZ libraries. As a result, when TZ information data for a TZ library becomes out of date, the inaccurate time data may adversely affect applications while the users wait for the operating system vendor to supply an update.

SUMMARY

According to one embodiment, a method dynamically reconfiguring time zones in real-time using a plurality time zone libraries comprises: integrating a first time zone information data (TZID) version and a second TZID version into a TZ library in an operating system; selecting a first configuration, wherein the first configuration includes the TZ library and the first TZID version; and responsive to adjusting the first configuration to a second configuration, utilizing the second configuration, wherein the second configuration includes the TZ library and the second TZID version, and wherein the second configuration is utilized automatically without restarting the operating system or an application.

According to another embodiment, a computer program product for dynamically reconfiguring time zones in real-time using a plurality of time zone libraries comprises: a computer readable storage medium readable by a processing circuit and storing instructions for execution by the processing circuit for performing method comprising: integrating a first time zone information data (TZID) version and a second TZID version into a TZ library in an operating system; selecting a first configuration, wherein the first configuration includes the TZ library and the first TZID version; and responsive to adjusting the first configuration to a second configuration, utilizing the second configuration, wherein the second configuration includes the TZ library and the second TZID version, and wherein the second configuration is utilized automatically without restarting the operating system or an application.

According to another embodiment, a computer system for dynamically reconfiguring time zones in real-time using a plurality of time zone libraries comprising a memory, a processing unit communicatively coupled to the memory, and a management module communicatively coupled to the memory and processing unit, wherein the management module is configured to perform the steps of a method comprising: integrating a first time zone information data (TZID) version and a second TZID version into a TZ library in an operating system; selecting a first configuration, wherein the first configuration includes the TZ library and the first TZID version; and responsive to adjusting the first configuration to a second configuration, utilizing the second configuration, wherein the second configuration includes the TZ library and the second TZID version, and wherein the second configuration is utilized automatically without restarting the operating system or an application.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of managing plural time zone libraries, and more particularly to time zone reconfiguration in real time. The following described exemplary embodiments provide a system, method and program product to provide an enhanced application program interface (API), such that multiple versions of time zone (TZ) information data may be dynamically selected, in real-time, for a TZ library.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
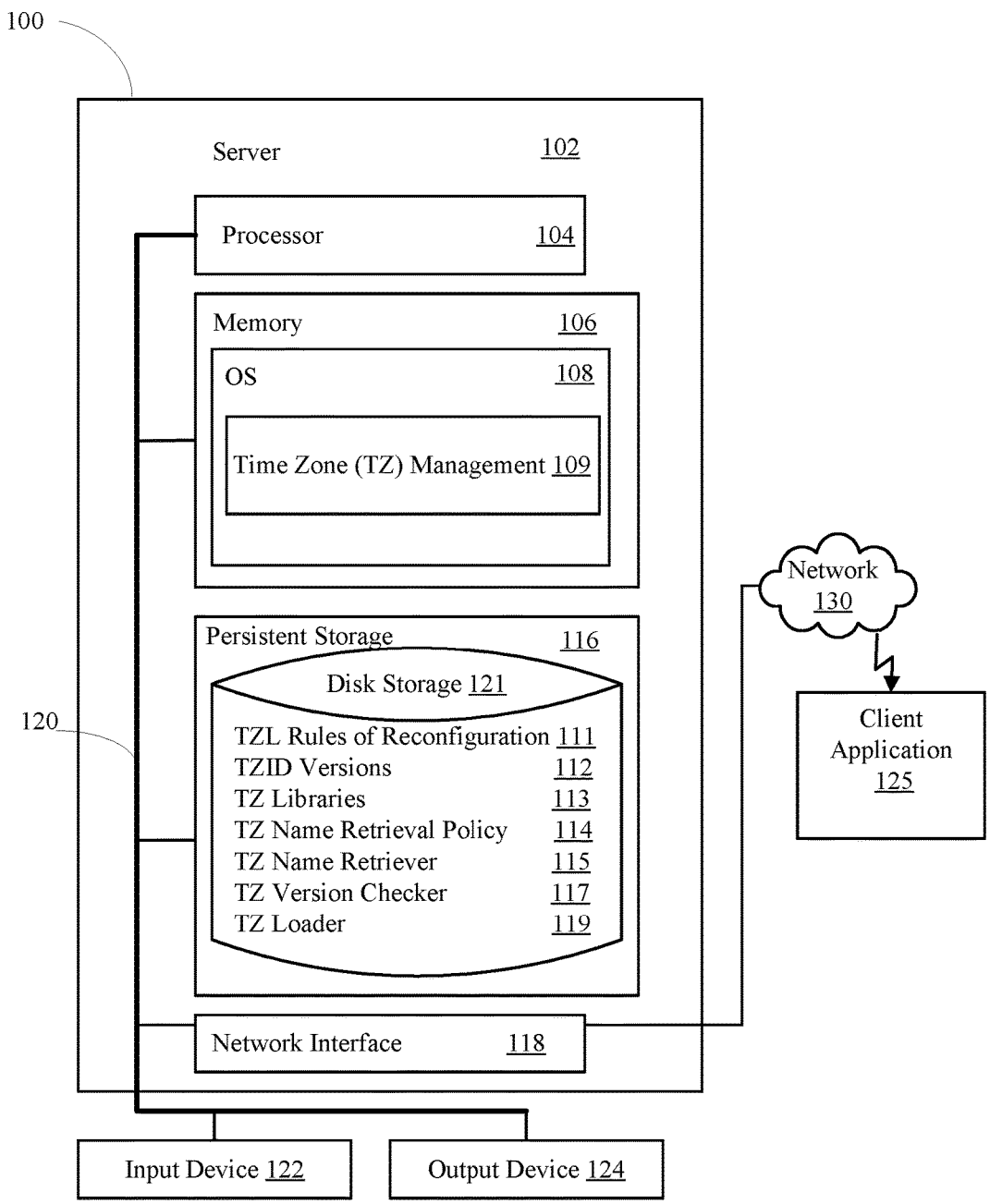
FIG. 1 illustrates an exemplary computer system environment operable for various embodiments of the disclosure.

Turning now to FIG. 1 a block diagram of an exemplary data processing system operable for various embodiments of the disclosure is presented. In this illustrative example, the data processing system 100 includes a server 102 providing enhanced TZ management 109. The server 102 may be connected to other computers and servers via a network 130. The network 130 may include connections, such as wire, wireless communication links, or fiber optic cables.

The server 102 includes a processor unit 104 that executes instructions for software, for example the operating system (OS) 108 and TZ management 109 (discussed in further detail with respect to FIGS. 1A and 1B) that may be loaded into memory 106. The processor unit 104 may be a set of one or more processors or may be a multi-processor core, depending on the particular implementation. Further, the processor unit 104 is connected, via a bus 120, to memory 106, a network interface device 118, disk storage 121, persistent storage 116, and input device 122, and an output device 124.

The server 102 is generally under the control of an OS 108, for example Linux. However, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger formats. The network interface device 118 may be any type of network communications device allowing the server 102 to communicate with other computers, including the client 125, via a network 130.

Persistent storage 116 is any device or hardware that is capable of storing information, such as, data, an OS 108, and program instructions, including those providing TZ management 109. Persistent storage 116 may take various forms depending on the particular implementation. For example, persistent storage 116 may be disk storage 121, a flash memory, optical disk, magnetic tape, cloud storage devices, or some combination of the above.

Instructions for the OS 108, TZ management 109, applications and/or programs may be located in persistent storage 116, which is in communication with processor unit 104 through the bus 120 fabric. In these illustrative examples the instructions are in a functional form on persistent storage 116. These instructions may be loaded into memory 106 for execution by processor unit 104.

The input device 122 may be any device for providing input to the server 102. For example, a keyboard and/or a mouse may be used. The output device 124 may be any device for providing output to a user of the server 102. Although shown separately from the input device 122, the output device 124 and input device 122 may be combined, as in a display screen with an integrated touch-screen.

As will be discussed with reference to FIG. 3, the server 102 and the computer hosting the client 125 may include internal components 800 and external components 900.

Figure 1A:
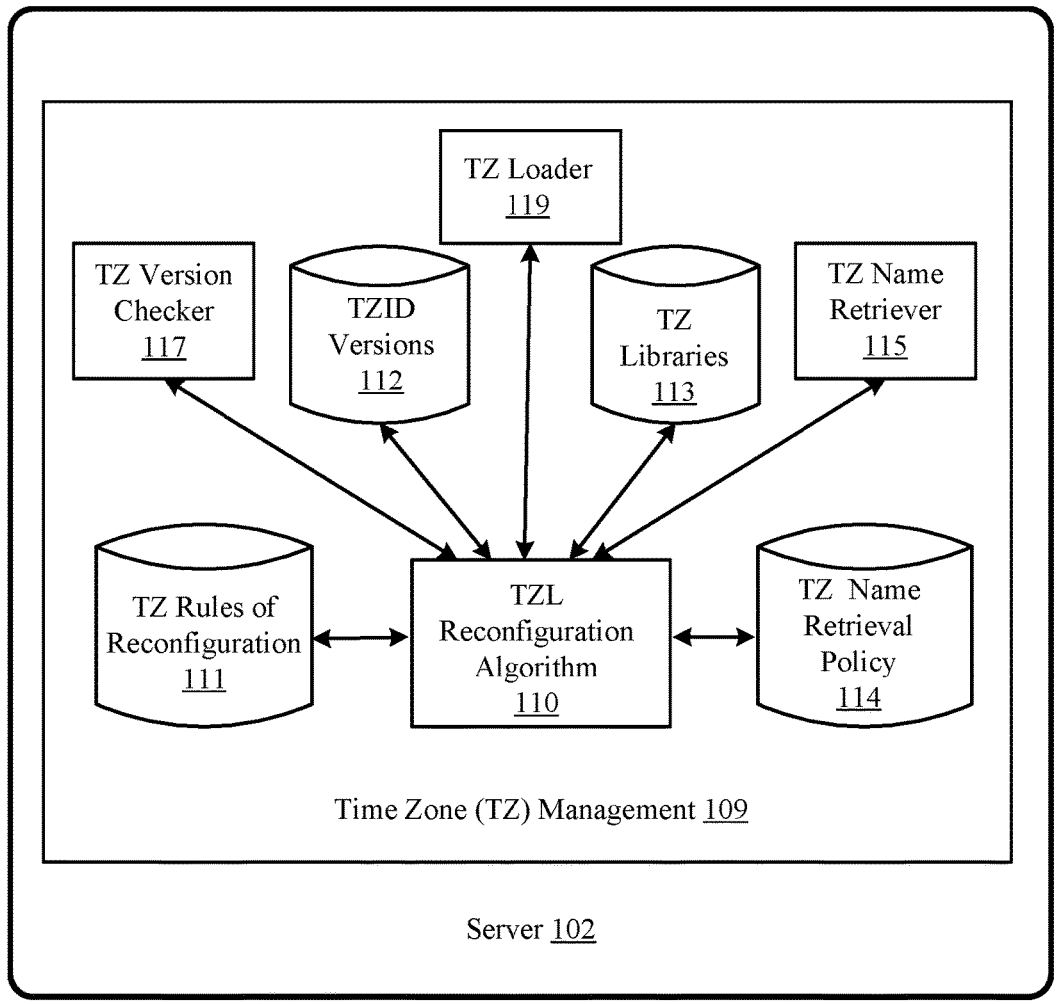
FIG. 1A illustrates components and algorithms associated with managing plural time zone libraries, according to various embodiments of the disclosure.

FIG. 1A further illustrates the components and algorithms associated with TZ management 109 running on the server 102, according to at least one embodiment of the disclosure. As used herein, time zone management 109 (FIGS. 1, 1A) includes functionality that the operating system performs on behalf of time management 109 (FIGS. 1, 1A), such as retrieving environment variables, and reading files.

Figure 2:
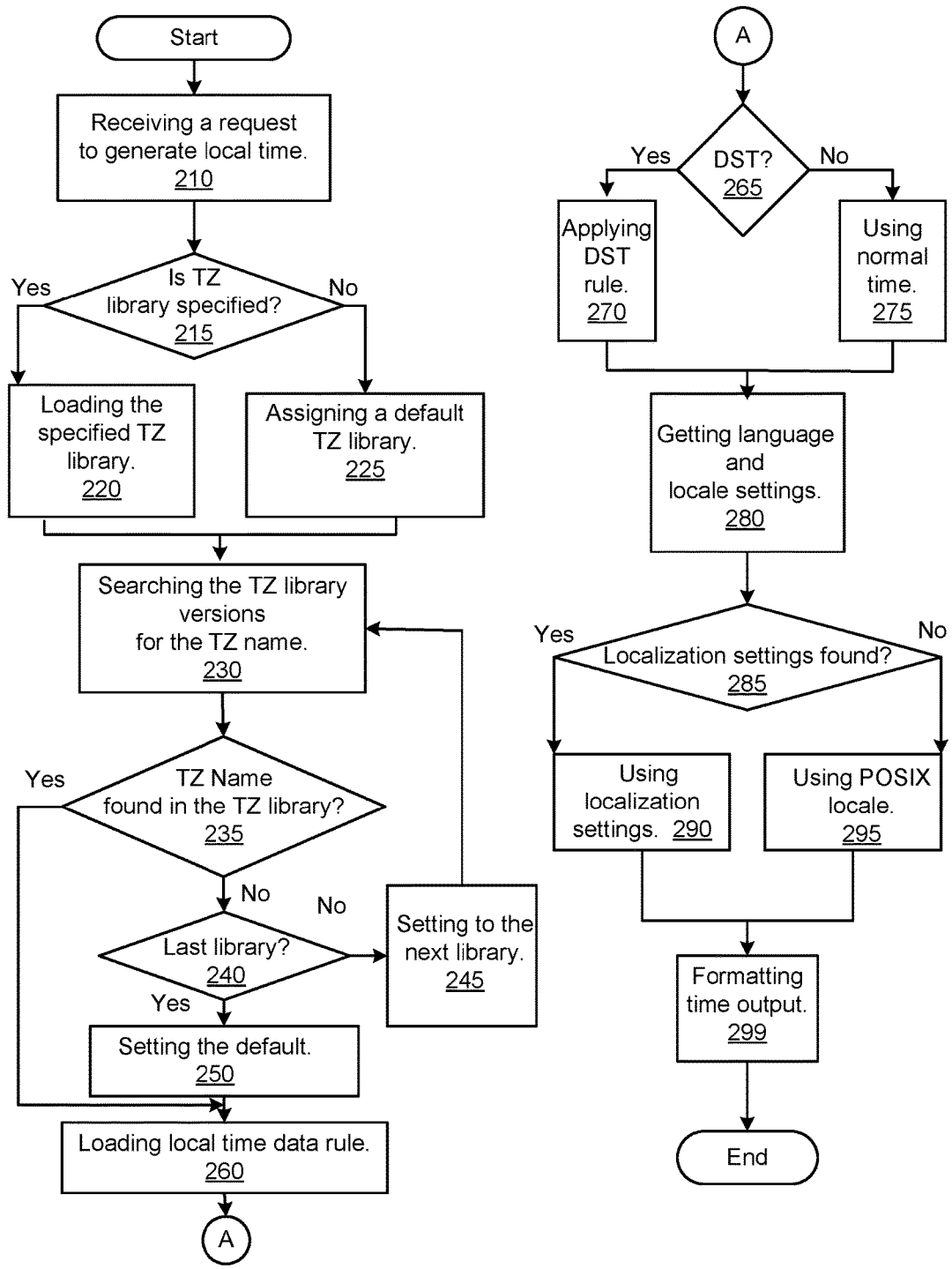
FIG. 2 is an operational flow chart of an exemplary embodiment of the disclosure.

A TZ reconfiguration algorithm 110, illustrated and explained in further detail with respect to FIG. 2, takes as input the time zone library (TZL) rules of reconfiguration 111 and the TZ name retrieval policy 114 to determine which of the TZ libraries 113 should be used to reconfigure the time settings on a computer. Time zone management 109 is shown and described through an algorithm, configuration rules, and components that are specialized for performing TZ information data and TZ library 113 management. However, those skilled in the computer arts will appreciate that time zone management 109 may be embodied in components and reconfiguration rules other than those described.

A TZ library is a compilation of information about the world's time zones that is primarily intended for use with computer operating systems and software programs. In the well-known Olson based TZ library implementation, data is organized by a unique name, referred to as a TZ name. The TZ name denotes a geographical location in the form of Area/Location, for example, America/New_York. Data that is associated with a TZ name includes an offset from Greenwich Mean Time (GMT), commonly referred to as Coordinated Universal Time (UTC), and the precise moment that local time transitions as one moves from one time zone to another. Each Area/Location entry and its associated data in a TZ library 113 may also be referred to as a TZ rule. For example, for time zones that observe daylight savings time (DST), the TZ rule specifies the precise dates and times of the transition to and from DST. Entries for an Area/Location may include rules that contain time zone data modifications for future dates, as well as historical data from prior decades.

Two other well-known time zone data formats are the Portable Operating System Interchange (POSIX) and International Components for Unicode for C and C++ (ICU4C). An exemplary TZ name in POSIX may take the form std offset dst (spaces added for readability), where std is a string that specifies the name of the time zone, offset is a value that when added to local time gives a UTC time value, and dst specifies a string that specifies the name of the time zone if DST is observed. In POSIX format, for example, America/ New_York may be indicated as EST5EDT. ICU4C provides an Olson based TZ library implementation that is optimized for Unicode. The Unicode standard provides a universal character set for text, thus enabling the processing, storage and display of text in many languages.

The Olson, POSIX, and ICU4C libraries, and the international standards to which they conform, are maintained by the different organizations that provide them. An operating system vendor receives the TZ library data from each of the providers and incorporates each TZ library 113 into the operating system in platform-dependent binary format. There may not be a coordinated update schedule among the different TZ library providers for supplying updated TZ library data. Therefore, if a user has an urgent need, such as to repair an error in the TZ rules, or if a location changes its TZ rules, an updated TZ library 113 may not be delivered in a timely manner to coincide with the operating system vendor's maintenance release. As a resolution, the operating system vendor may periodically provide updates to the TZ library 113 in time zone information data (TZID) versions 112. A TZID version 112 may contain a series of files, for example, one for each TZ name (i.e., Area/Location) or only for a particular Area. With this architecture, the operating system vendor may be able to respond more quickly to a customer's request for maintenance, since only the TZ data for the affected area, for example, for America/Argentina/San_Luis needs to be provided, even if TZ library data is not yet available for other Areas and Locations. Since the granularity of the TZ data is localized to America/Argentina/San_Luis, customers in other time zones may decide not to install this update without negatively impacting the operation of their computers and applications.

In addition to the well-known TZ libraries 113, a user may customize a TZ library 113 for the requirements of the user's location and computer system. For example, a given geography (e.g., a region, city, time zone, etc.) may now be required to observe DST, where before only standard time was observed. As previously described, a TZID version 112 containing the new TZ rules for the geography needing the change may not be available in time for the geography to begin observing DST. Without an updated TZ library 113, the computer's operating system can only reflect the now-outdated TZ rules to applications requesting the local time and date. In this case, the system administrator may create a customized TZ library 113 for use, for example, until the new updated TZ rules are incorporated in a new TZID version 112 for one of the main TZ libraries 113. Alternatively, the system administrator may prefer to modify and use this customized TZ library 113 instead. An operating system vendor may provide a set of software utilities to facilitate the system administrator's creating a customized TZ library 113.

The TZL rules of reconfiguration 111 represent a set of pre-defined variables and associated system logic through which a user customizes the interaction with an application or operating system. The TZL rules of reconfiguration 111 also provide guidance to the operating system, such as defining a priority order for choosing TZ libraries 113, and defining the location, i.e., path, where the TZ libraries 113 are stored. The pre-defined variables include LANG, which sets the system's default locale, i.e., language, territory, and code set combinations used to identify a set of language conventions, and LC_TIME, which determines the locale for date and time formatting. The TZ environment variable contributes to setting the TZ rules for the operating system. The format of the value of the TZ environment variable may vary, depending upon the particular system implementation. In that case, system logic may determine, for example, which TZ library 113 should be accessed to set the TZ rules. The TZL rules of reconfiguration 111 may predefine default settings for all users on a system-wide basis. However, the system-wide defaults may be overwritten by setting one or more of the environment variables in the profile of an application or user.

The TZ name retrieval policy 114 consists of a set of conventions that are input to the TZ name retriever 115 for exploring a best fit for a TZ name. The TZ name retrieval policy 114 is a platform dependent policy that may be modified by a user, using for example a command line, graphical user interface (GUI), program code, or other similar interface provided for the purpose.

The TZ name retriever 115, applies the TZ name retrieval policy 114 and the TZL rules of reconfiguration 111 to determine a TZ name and TZ library 113 to search for the appropriate TZ rules for the customer's installation. For example, a TZ environment variable setting in the form of Area/Location may suggest to the TZ name retriever 115 that a TZ library 113 having an Olson format should be searched. Similarly, a TZ environment variable in the form of std offset dst (spaces added for readability) may indicate that a POSIX format TZ library 113 should be searched. According to the TZ name retrieval policy 114, the TZ name retriever 115 may search any other available list of TZ libraries 113 and TZID versions 112, in addition to the current list pointed to by the TZ name retrieval policy 114. For example, if the TZ name retriever 115 does not find the expected TZ name, the TZ name retriever 115 may search in another available TZ library 113 and related TZID versions 112. If the expanded search fails, the TZ name retriever 115 may use the default UTC format instead.

The TZ version checker 117 compares TZID versions 112 and maintains the user-defined search order for TZ libraries 113 and the TZID versions 112 within the TZ libraries 113. In one embodiment, as part of a system-wide configuration task, for example, ft user, typically the system administrator, may dynamically re-arrange the order the TZ version checker 117 uses to search the TZ libraries 113 and TZID versions 112 within them. A system-wide TZ reconfiguration may require a reboot of the operating system, since the major operating system processes require an orderly stop and restart to activate the changes. However, the TZ version checker 117 sets the default TZL pointer 134 (FIG. 1B), according to the user's selection, thereby allowing the user to dynamically perform a system-wide TZ reconfiguration without the aforementioned disruptions. In practice, for example, the user may invoke a configuration graphical user interface (GUI) displaying the available TZID versions 112. The user may define a search order that specifies that the most current TZID version 112 should be the first in the search order only for applications in the test environment. The TZ version checker 117 and the default TZL pointer 134 (FIG. 1B) allow the user to dynamically re-arrange, i.e., update, the search order as-needed until sufficient testing is completed. The user may then alter the search order and promote the most current TZID version 112 to first in the search order in the production environment. As the user orders and alters the search order for TZ libraries 113 and TZID versions 112, the TZ version checker 117 is invoked to maintain the user's search order. TZ version checker 117 may maintain the user-defined search order as an ordered list, such as a linked list, ordered by timestamps, version numbers, a date associated with a TZID version 112, a patch identifier, or other similar factors. In another embodiment, assuming proper authorization, an individual user (i.e., not a systems administrator) may similarly perform TZ reconfiguration for a particular application or group of users for which the user has support responsibility. In this case, system security settings may limit the scope of permissible changes to only those specific to the profiles defined for the application or users.

Figure 1B:
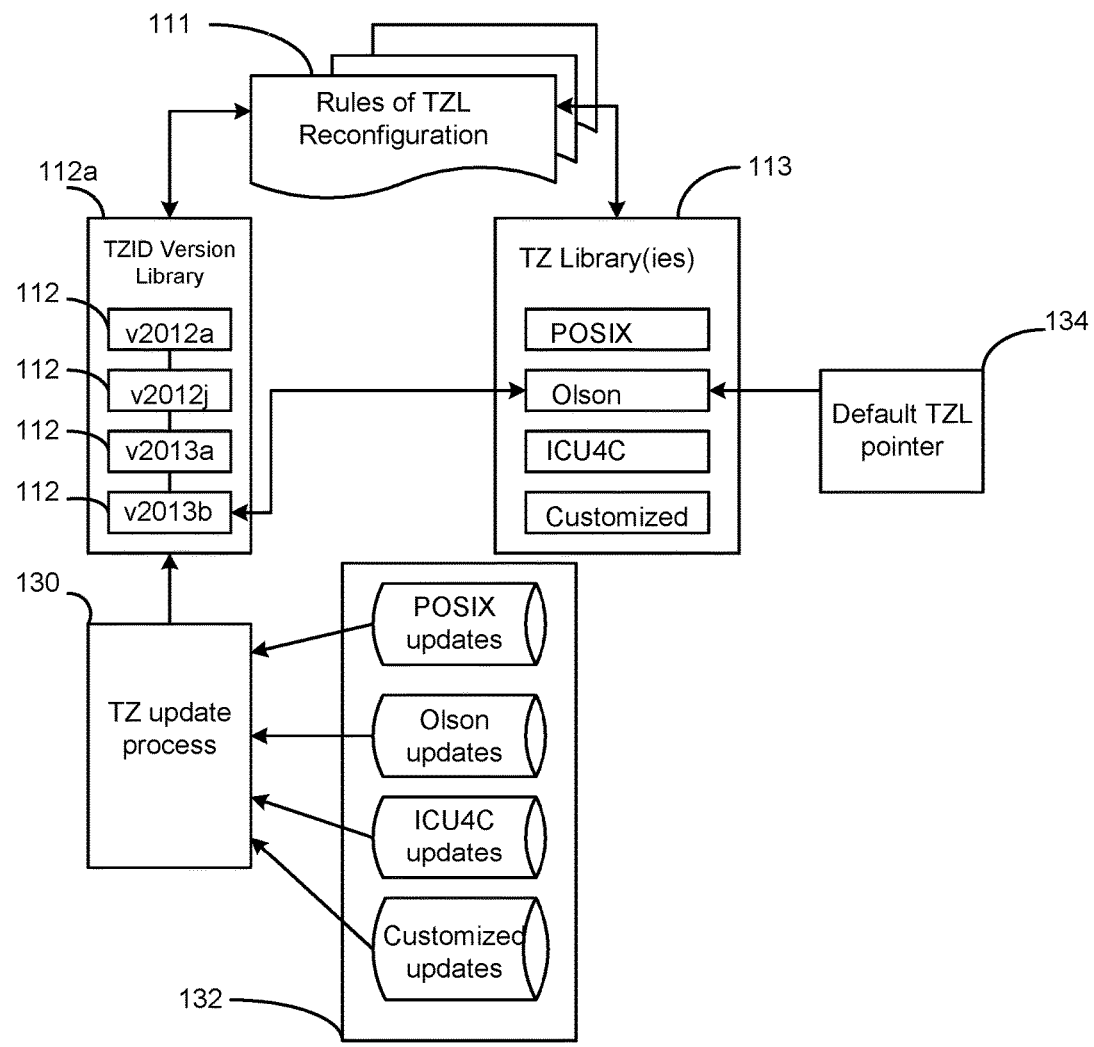
FIG. 1B illustrates components associated with time zone version data, according to various embodiments of the disclosure.

FIG. 1B further illustrates the components (previously discussed in FIG. 1A) associated with TZ information data within TZ management 109 (FIGS. 1, 1A). The TZL rules of reconfiguration 111 represent variables that customize the interaction of a user or application with the operating system. The TZL rules of reconfiguration 111 are shown as a number of files, each representing the customization settings for a user, application, or the system default profile. The TZL rules of reconfiguration 111 provide guidance to the TZ name retriever 115 (FIGS. 1, 1A) and the operating system in locating the required TZ library 113 and TZID version 112. For each of the TZ libraries 113, there may be one or multiple TZID versions 112, collected into a TZID version library 112a. Each of the TZID versions 112 shown represents a maintenance update to the TZ library 113. Here, the Olson library is associated with the TZID versions 112: v2012a; v2012j; v2013a; and v2013b. The various TZID versions 112 within the TZID version library 112a may be files, tables, arrays, lists, or other organization schemes suitable for the purpose of searching and retrieving data collections.

As shown, the default TZL pointer 134 indicates that the Olson library is the default TZ library 113 and version v2013b is the default TZID version 112, resulting in the default pairing of Olson and v2013b. The TZL pointer 134, is set based on the user-defined search order, as maintained by the TZ version checker 117 (FIGS. 1, 1A). However, a user may require a TZ rule that is not contained within the default version, v2013b. As described with reference to the TZ version checker 117 in FIG. 1A, the user may dynamically select another TZID version 112 within the TZ library 113. Alternatively, the user may choose to view other TZ libraries 113 and their corresponding lists of TZID versions 112.

When a vendor provides maintenance updates to an operating system, updates to the various TZ libraries 113, here indicated as 132, may be provided as part of the maintenance as well. A platform-dependent TZ update process 130 installs the various TZ library updates 132 to a location where TZ management 109 (FIG. 1, 1A) or other processes of an operating system, may access them. The various user-defined and default search orders may be updated according to the TZ name retrieval policy 114.

FIG. 2 describes an exemplary embodiment of the TZ reconfiguration algorithm 110 (FIG. 1, 1A). The TZ reconfiguration algorithm 110 (FIG. 1, 1A) is a process for managing plural time libraries for time zone reconfiguration in real-time. In some implementations, a user makes a TZ reconfiguration while logged into the computer within a shell. A shell is a system-supplied interface through which the user enters commands and otherwise interacts with the operating system. For the TZ reconfiguration to take effect, the user may be required to log off and establish a new shell environment, which will now contain any updated environment variables, such as the TZ environment variable representing the user's desired time zone. A system-wide TZ reconfiguration may require a reboot of the operating system, since the major operating system processes require an orderly stop and restart. The exemplary embodiment of the present invention, described in FIG. 2, allows the user to dynamically perform TZ reconfiguration without the aforementioned disruptions.

At 210 a user or application program requests the computer's local time using a computer-provided interface. For example, an application program may invoke the localtime( ) system library subroutine or a user may issue the date shell command. Local time is derived from the computer's system time. System time is measured by the system clock, which typically counts the number of ticks since some arbitrary starting date. System library subroutines and commands convert the system time to a human-readable format, applying any localization and time zone settings as part of the conversion.

Upon receiving a request to format local time, at 215 time zone management 109 (FIGS. 1, 1A) checks to see if a TZ library 113 is specified in the request. If so, time zone management 109 searches the pre-defined variables of the TZL rules of reconfiguration 111 (FIGS. 1, 1A) for a setting corresponding to a desired TZ library format, such as Olson. An operating system maintains a set of variables, typically referred to as a default profile, that define the operating environment. Each user and application may have an individualized profile containing its own variable settings. Where a variable is defined, that setting may override the corresponding setting in the default profile. However, where a variable is not present, then the user or application profile inherits the variable and its setting from the default profile.

If at 220 a setting corresponding to a TZ library 113 is located within the TZL rules of reconfiguration 111 (FIGS. 1, 1A), then the specified TZ library 113 is loaded. However, if at 225 a variable is not set to indicate the desired TZ library 113, or if, for example, the desired TZ library 113 cannot be found, another TZ library 113, for example, the TZ library 113 setting from the system default profile is used. Subsequently, a component of TZ management 109 (FIGS. 1, 1A) for example, a TZ loader 119 (FIGS. 1, 1A), makes the corresponding TZ library 113 available, for example, by opening the files in the TZ library 113, or loading the TZ library data into computer memory.

Having established the desired TZ library format, at 230 the TZ name retriever 115 (FIGS. 1, 1A) searches through the versions of TZID version 112 that are associated with the TZ library 113, in the search order established by the TZ version checker 117 (FIGS. 1, 1A), to find an entry matching the desired TZ name. A TZ name setting may be retrieved from a user or application customized profile, or may be supplied from the system default profile, in a manner similar to how a profile setting for a TZ library is derived. As previously described with reference to FIG. 1B, the TZID version 112 may exist in the TZID version library 112a as versioned updates to the TZ library 113. The search order of the TZID versions 112 may be set along with other TZL rules of reconfiguration 111 (FIGS. 1, 1A), i.e., in the user, application, or default profile.

If, at 235, an entry matching the desired TZ name is found, the correct TZ rule for the desired geographical location is loaded at 260. However, if at 235, an entry matching the desired TZ name is not found within the selected TZ library 113 and all the TZID versions 112 have been exhausted, if there is another TZID version 112 available to search, at 240, the TZ loader 119 (FIGS. 1, 1A), opens the next TZ library 113 at 245, and the search is performed on the TZID versions 112 within this new TZ library 113. However, if this is the last TZ library 113 and the TZ name still is not located, then at 250 a default TZID version 112 or TZ library 113, TZID version 112 pair or a default format, such as the UTC format, is set for the subsequent processing. At 260, the TZ rule for the desired geographical location is loaded from the default setting at 260.

If, at 265, the TZ rule as selected at 260 indicates that DST is observed, then at 270 the DST rule from the TZ rule is applied to derive local time, otherwise, at 275 local time is calculated from the normal, i.e., standard, TZ rule for the TZ name. Proper display of the newly-derived local time depends upon applying a set of language conventions that are consistent with the geographical location that is associated with the TZ name. For example, some languages, such as English, may be represented using standard American Standard Code for Information Interchange (ASCII) encoding. However, languages such as Chinese or Japanese require an extended language encoding using multibyte characters. Language conventions, also called locale settings, are a set of parameters that define the language, country, and local variations for display of date and time, currency, rendering and layout of text strings, for example. At 280, TZ management 109 (FIGS. 1, 1A) retrieves, either directly or by requesting such from the operating system, or the applicable environment variables, particularly LANG. Unlike the time zone environment variables with respect to the TZL rules of reconfiguration 111 (FIGS. 1-1B), the LANG environment variable is a system-wide value. An individual user or application may override LANG with variants of a local environment variable in the form of "LC\_," such as LC\_TIME for determining locale rules governing date and time formatting and LC\_MONETARY for formatting money values.

If at 285, a user or application has defined local overrides to the LANG environment variable, at 290, the derived local time is formatted using the local overrides. By default, however, at 295, the system-wide POSIX LANG setting is applied.

At 299, the derived local time is displayed using the desired localization settings. However, the user may not approve of the displayed local time, for example, if the start and stop dates and times are incorrect for DST. In that case, as described with reference to the TZ version checker 117 of FIGS. 1 and 1A, the user may optionally change one or more selections in the request, such as, for example, the requested TZ library, a different TZID, or a different localization setting, and perform the search request again.

Figure 3:
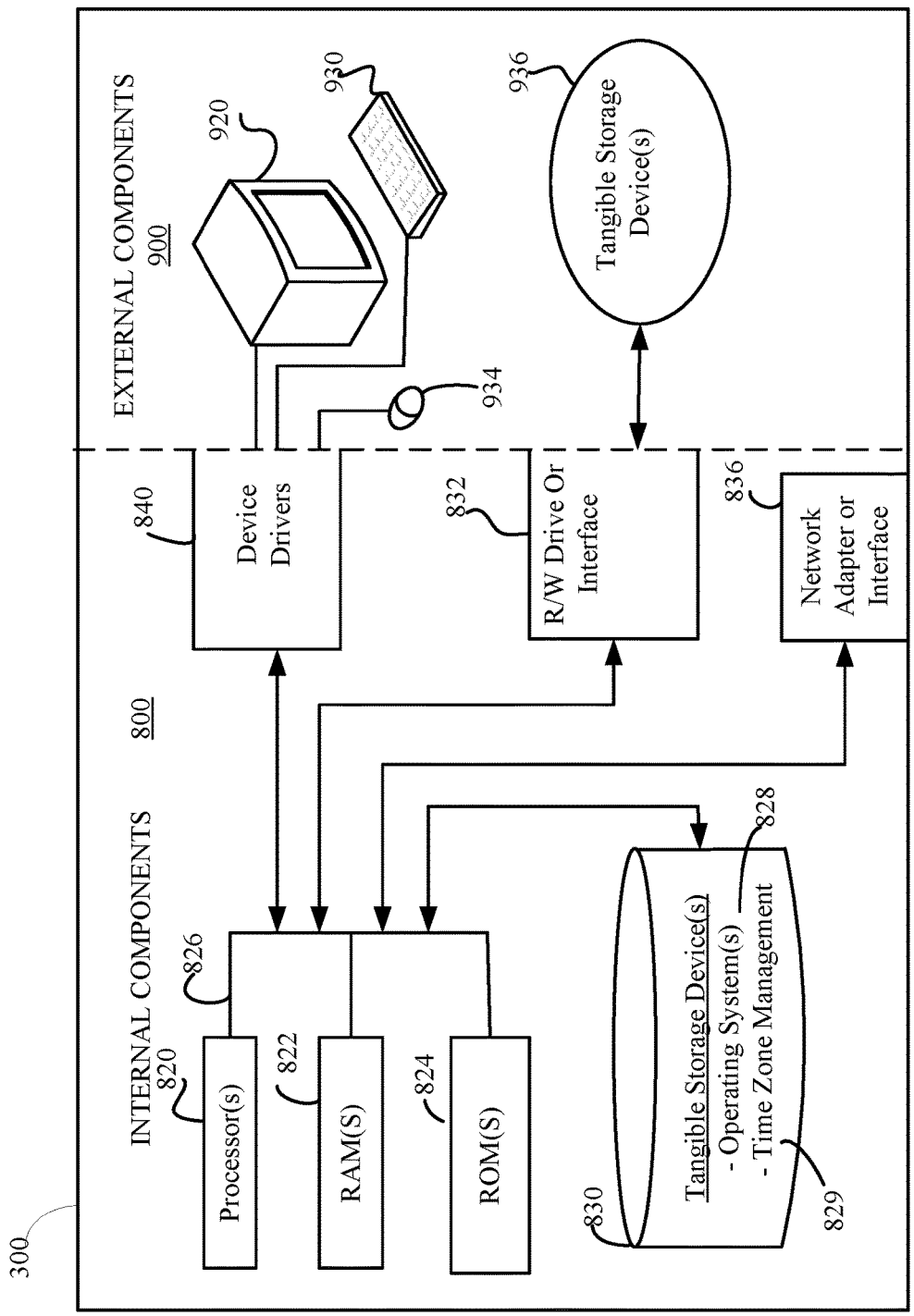
FIG. 3 is a schematic block diagram of hardware and software of the computer environment according to an embodiment of the process of FIG. 2.

Referring now to FIG. 3, computing device 300 may include respective sets of internal components 800 and external components 900 that together may provide an environment for a software application, such as a time zone (TZ) management system. Each of the sets of internal components 800 includes one or more processors 820; one or more computer-readable RAMs 822; one or more computer-readable ROMs 824 on one or more buses 826; one or more operating systems 828; one or more software applications (e.g., TZ management 829) executing the method 200; and one or more computer-readable tangible storage devices 830. The one or more operating systems 828 and time zone management modules 829 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The time management modules 829, and operating system 828 that are associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer system for retrieving local time using a plurality of time zone (TZ) libraries comprising: a memory, one or more processors communicatively coupled to the memory, one or more non-transitory computer readable storage devices, and a plurality of program instructions stored on at least one of the one or more storage devices for execution by at least one of the one or more processors, to cause the computer system to perform a computer-implemented method comprising:

receiving, a by TZ management component of an operating system, a request for a local time setting of a computer, wherein the request includes a preferred TZ library, a preferred TZ information data (TZID) version, a preferred TZ name, a plurality of TZ library rules of reconfiguration, and a TZ name retrieval policy;

searching each of a plurality of TZ libraries and each of a plurality of TZID versions, wherein the plurality of TZ libraries and the plurality of TZID versions are integrated into the operating system, beginning with the preferred TZ library, in a user-defined pre-defined search order, for the preferred TZID version and the preferred TZ name;

based on the searching returning the preferred TZID version and the preferred TZ name, dynamically loading a corresponding TZ rule for formatting the local time of the computer without restarting the operating system or application;

based on the searching not returning the preferred TZID version and the preferred TZ name, dynamically loading a default TZ rule, based on a setting of a user-defined default TZ library pointer without restarting the operating system or application; and based on the TZ rule indicating that daylight savings time (DST) is observed, applying the DST rule from the TZ rule for deriving the local time and formatting the local time using a system-wide localization rule or a user-defined localization rule.

2. The computer system of claim 1, wherein the searching each of the plurality of TZ libraries and each of the plurality of TZID versions is performed utilizing TZ rules of reconfiguration and the default TZ library pointer, and wherein each of the plurality of TZ libraries includes a different plurality of TZID versions.

3. The computer system of claim 1, wherein:
the default TZ library pointer is set to a default TZ library and default TZID version pair, based on a user-defined search order; and
the default TZ library pointer is automatically reset to a new TZ library and a new TZID version pair, based on the TZ rules of reconfiguration dynamically changing the search order of the plurality of TZ libraries and the plurality of TZID versions.

4. The computer system of claim 1, wherein the plurality of TZ rules of reconfiguration include:
at least one pre-defined environment variable;
a list for prioritizing an order in which to load the plurality of TZ libraries and the plurality of TZID versions;
a list of operating system directories and files used by the operating system to locate and load the plurality of TZ libraries and the plurality of TZID versions; and
logic for selecting and reconfiguring the search order of the plurality of TZ libraries and the plurality of TZID versions.

5. The computer system of claim 1, further comprising:
displaying a list of available TZID versions from a TZ library;
re-ordering the displayed list of available TZID versions and the default TZ library pointer, based on user-defined input;
updating the default TZ library pointer and the TZ version checker with the re-ordered list of available TZID versions; and
utilizing automatically the re-ordered list of available TZID versions without restarting the operating system and without restarting an application.

6. The computer system of claim 1, wherein the TZID versions are at least one of:
an ordered list;
a linked list;
one or more arrays;
one or more tables; and
a set of algorithms.

* * * * *